United States Patent

Krude

[11] 4,020,648
[45] May 3, 1977

[54] CONSTANT VELOCITY TORQUE TRANSMITTING JOINT

[75] Inventor: Werner Krude, Neunkirchen, Germany

[73] Assignee: Lohr & Bromkamp GmbH, Offenbach (Main), Germany

[22] Filed: Dec. 5, 1975

[21] Appl. No.: 638,063

[30] Foreign Application Priority Data

Dec. 23, 1974 Germany .......................... 2461226

[52] U.S. Cl. .......................................... 64/21; 64/8
[51] Int. Cl. ............................................ F16d 3/30
[58] Field of Search ............................... 64/21, 8, 7

[56] References Cited

UNITED STATES PATENTS

| | | | |
|---|---|---|---|
| 2,319,100 | 5/1943 | Anderson | 64/21 |
| 3,522,714 | 8/1970 | Wildhaber | 64/21 |
| 3,668,893 | 6/1972 | Schmid | 64/21 |
| 3,875,762 | 4/1975 | Tampalini | 64/8 |

Primary Examiner—Samuel Scott
Assistant Examiner—Randall Heald
Attorney, Agent, or Firm—Edmund M. Jaskiewicz

[57] ABSTRACT

A constant velocity torque transmitting joint comprises an outer joint member having a bore therethrough and an inner joint member positioned within the bore. A plurality of torque transmitting elements, such as balls, are positioned within pairs of opposed grooves formed in the facing surfaces of the inner and outer joint elements. A cage is disposed between the joint elements and has a plurality of openings to retain the balls therein. The cage has an inner concave surface guided upon a convex spherical surface of the inner joint member and an outer spherical surface guided within the bore. The cage comprises a plurality of individual segments each of which receives at least one torque transmitting element and the segments are supported in the radial direction either by direct mutual engagement or by a retaining ring.

4 Claims, 11 Drawing Figures

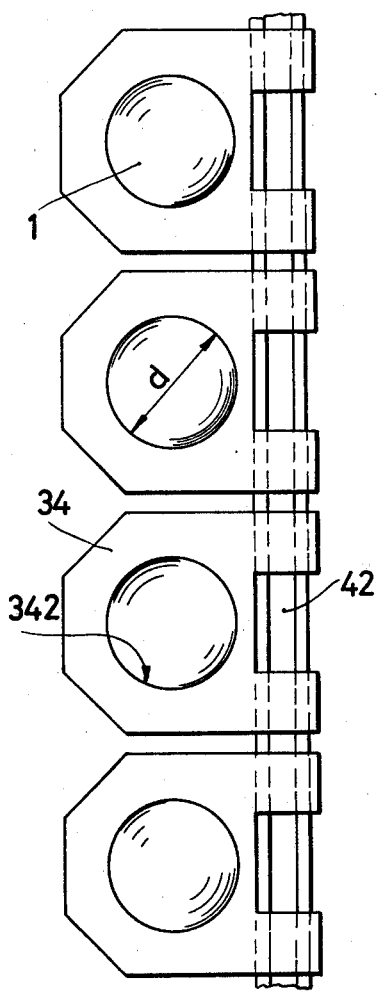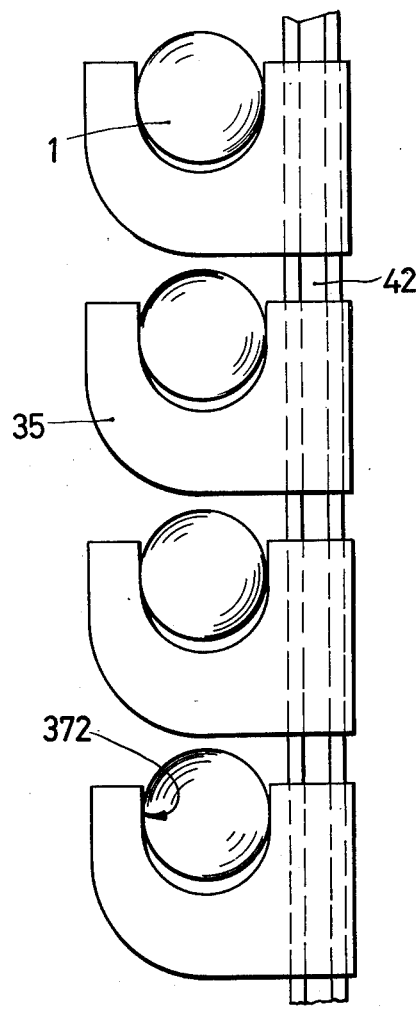
Fig. 6
Fig. 7

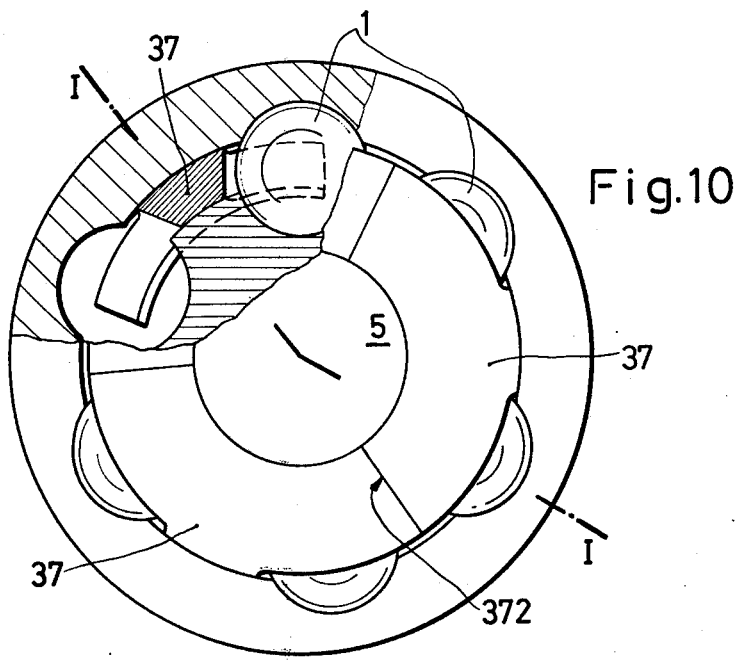
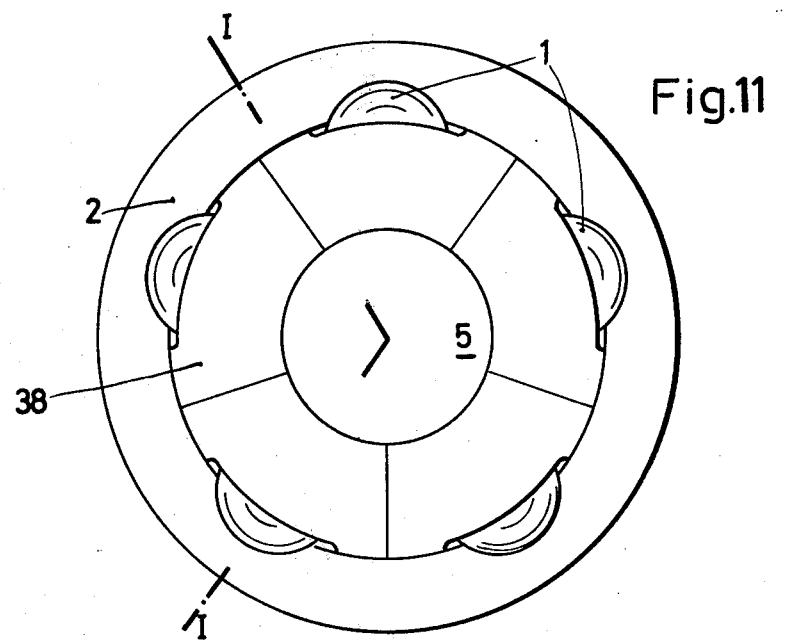

CONSTANT VELOCITY TORQUE TRANSMITTING JOINT

The present invention relates to constant velocity torque transmitting joints, more particularly, to the cage for retaining the torque transmitting elements in such a joint It has been known to provide a constant velocity torque transmitting joint, or universal joint, comprising an outer joint member having a bore therethrough with an inner joint member being positioned within the bore. The bore and the outer surface of the inner joint member are each provided with a corresponding number of grooves and a torque transmitting element which may be a ball is positioned in each pair of opposed grooves. A cage is disposed between the joint elements and comprises a plurality of openings which retain the balls therein such that the centers of the balls are positioned in a plane perpendicular to the longitudinal axis of the cage and which bisects the bending angle between the inner and outer joint members. The cage has an inner concave spherical surface which is guided upon a convex shperical outer surface of the inner joint member or a control device positioned on the inner joint member. The cage is also provided with a spherical outer surface which is guided upon the bore surface of the outer joint member. The centers of the cage outer and inner spherical surfaces are positioned equidistantly on opposite sides of the ball plane.

Such joints have had the disadvantage that the ball retainer cages are manufactured in one piece and that a plurality of multistage machining operations are required. Further, a joint of this construction can be assembled only if the inner joint member and the shaft to which it is connected are two separate coponents because the inner joint member must be tilted into an oblique position in order to be inserted into the cage.

It is therefore the principal object of the present invention to provide a novel and improved ball retainer cage for a constant velocity torque transmitting joint.

It is another object of the present invention to provide a cage for such a joint which can be readily assembled in the joint and which can be fabricated by shaping operations which do not involve removal of material.

It is a further object of the present invention to provide a cage for such a joint which simplifies assembly of the joint even when the inner joint member and the shaft connected thereto are in one piece while at the same time maintaining the depth of the ball track groove so as not to impair the functioning and operating life of the joint.

According to one aspect of the present invention the constant velocity torque transmitting joint having the outer and inner joint members drivingly connected by torque transmitting elements retained in a cage has a concave surface on the inner face of the cage which is guided on the convex exterior surface of the inner joint member or of a separate alignment control device supported on the inner joint member. A spherical outer face of the cage is guided in the bore of the outer joint member. The centers of the convex outer and concave inner cage spherical surfaces are positioned equidistantly on opposite sides of a plane passing through the centers of the torque transmitting elements. The cage comprises a plurality of individual segments each of which accommodates at least one of the torque transmitting elements and these segments are supported in the radial direction by direct mutual engagement or by means of an annular retaining member.

One of the advantages of the present invention is that the process of assemblying the joint is significantly simplified and the cost of manufacturing the joint is substantially reduced since the cage segments may be manufactured by on-machining procedures.

According to the present invention the individual segments of the cage are slidable in the circumferential direction of a retaining ring. An advantage of this structure is that kinematically conditioned ball movements in the circumferentially direction are compensated by movement of the segments with respect to the retaining ring. As a reslult, it is possible to reduce Hertz compression by making the cage openings which accommodate the torque transmitting elements of a cylindrical configuration. Other objects and advantages of the present invention will be apparent upon reference to the accompanying description when taken in conjunction with the following drawings, which are exemplary, wherein;

FIG. 6 is a developed view of a modified form of the cage segment;

FIG. 7 is a developed view of still another form of cage segments;

FIG. 10 is an end elevational view of the joint of FIG. 9 with a portion thereof being cut away; and FIG. 11 is an end elevational view of the joint of FIG. 9 but showning another form of the cage segments.

Proceeding next to the drawings wherein like reference symbols indicate the same parts throughout the various views a specific embodiment and modifications of the present invention will be described in detail.

Figure 1:
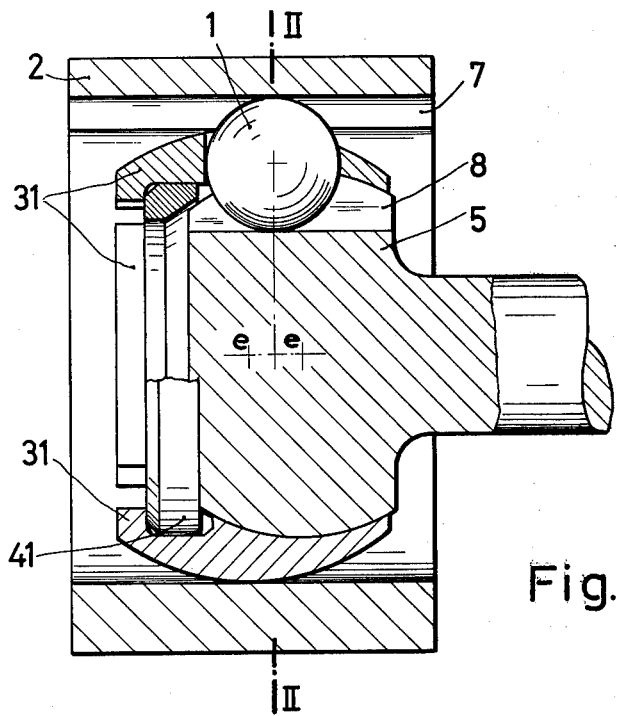
FIG. 1 is a longitudinal sectional view of a constant velocity troque transmitting joint having a cage comprising a plurality of individual segments according to the present invention.
Figure 2:
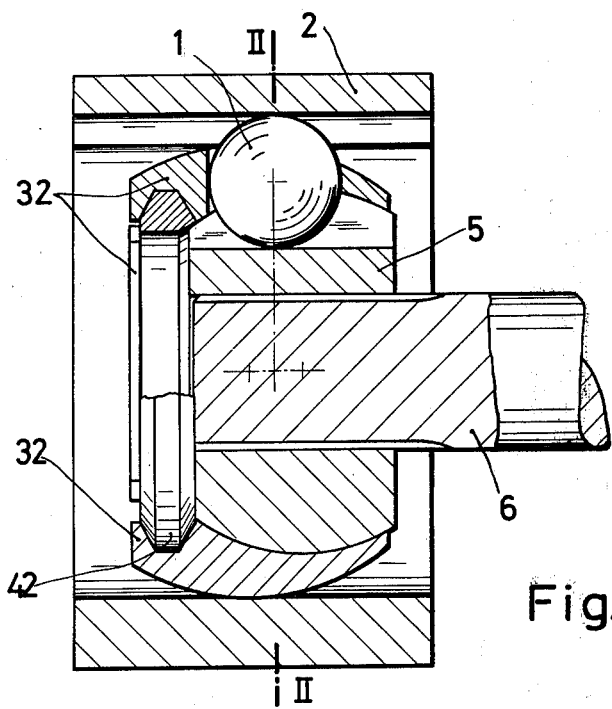
FIG. 2 is a view similar to FIG. 1 but showing a modification of the cage.

In FIGS. 1 and 2 there is illustrated a constant velocity torque transmitting joint comprising an outer joint member 2 having a bore therethrough and a plurality of track grooves 7 being formed in the face of the bore to accommodate torque transmitting elements in the form of balls 1. An inner joint member 5 is positioned within the bore of the outer joint member 2 and is also provided with a corresponding number of track groove 8 in its outer surface for receiving the balls 1. Thus each ball 1 is jointly received in a pair of opposed grooves 7 and 8 of the outer and inner joint members.

The balls 1 are retained in openings formed in a cage comprising a plurality of segments 31 in FIG. 2 and segments 32 in FIG. 2. The segments 31 of FIG. 1 are supported in the radial direction by a retaining ring 41 which is received within an arcuate groove formed in the inner surfaces of the cage segments 31. The segments 31 are slidable in a circumferential direction with respect to the retaining ring 41.

In FIG. 2, the cage segments 32 are similarly supported in the radial direction by a retaining ring 42.

To improve the alignment control of the joint the centers of the spherical outer and inner surfaces of the cage segments 31 and 32 are located at equal distances $e$ on oppoosite sides of a plane passing through the centers of the balls 1.

Figure 3:
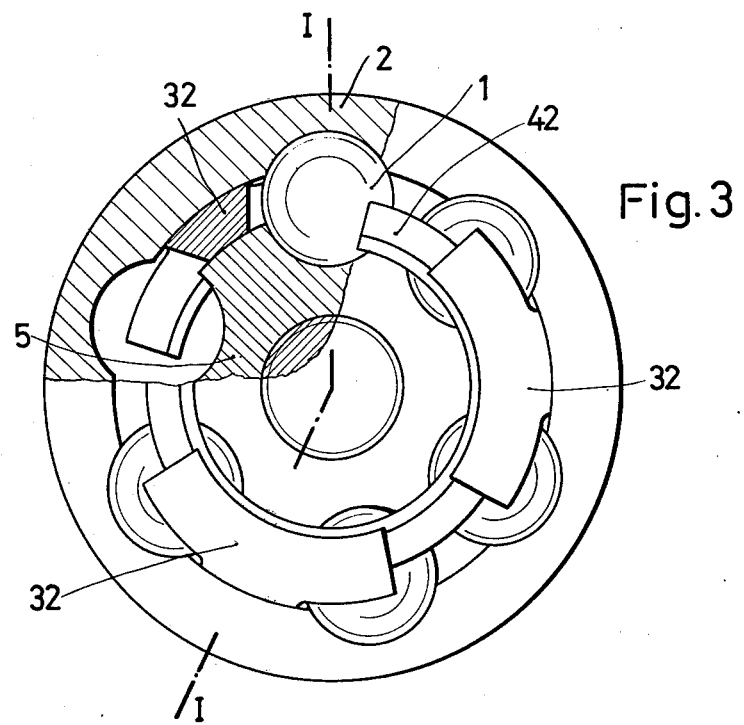
FIG. 3 is an elevational view of the joint in FIGS. 1 and 2 with a portion thereof being cut away.

In the structure of FIGS. 2 and 3, each cage segment 32 guides two balls 1 in the track grooves 7 and 8. In addition, the cage segments 32 are slidably supported by its convex outer surface engaging the surface of the bore passing through the outer joint member. The inner concave surfaces of the cage segments 32 are slidably supported on the inner joint member 5 as can be seen in FIG. 2.

Figure 4:
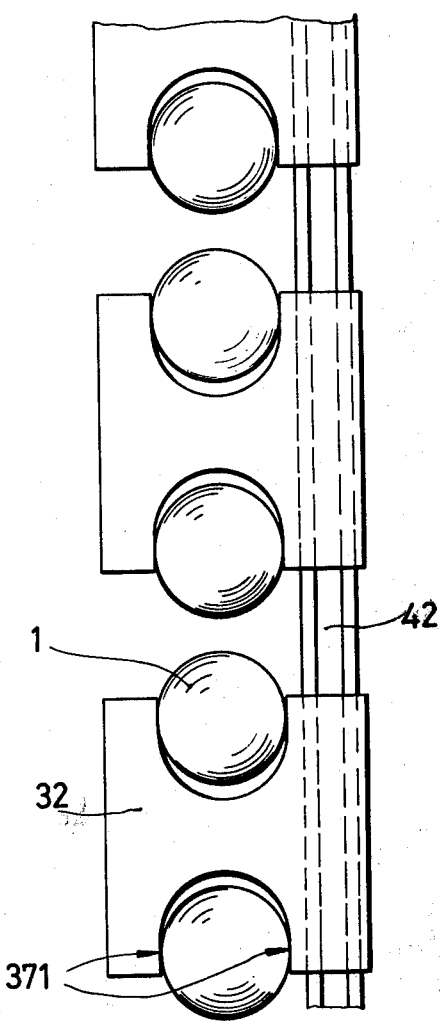
FIG. 4 is a developed view of the cage segments of the joint of FIGS. 1 and 2.

Each cage segment 32 has openings at each end thereof as may be seen in FIG. 4 such that each opening guides a ball 1 along circumferentially provided guide sufaces 371.

Figure 5:
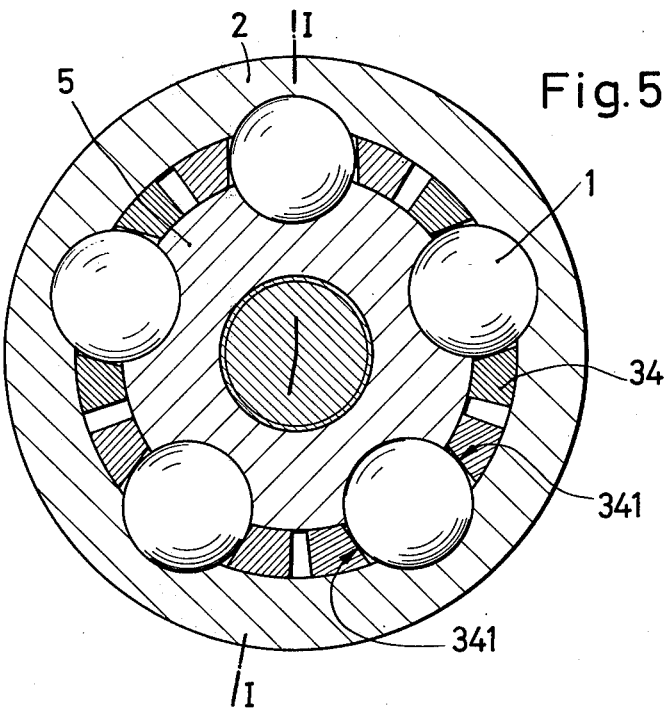
FIG. 5 is a sectional view taken along the line II—II of FIGS. 1 and 2.

In the constant velocity joint illustrated in FIGS. 5 and 6, each of the cage segments 34 is provided with a single cylindrical bore therethrough so as to receive one ball therein. Each of the cylindrical openings has a diameter $d$ which is substantially the same diameter as the balls 1. As a result of this supporting structure for the balls 1, Hertz compression is significantly reduced because of the linear contact between a ball 1 and guide surfaces 341 and 342. The segments 34 are similarly arranged for circumferentail sliding movement upon the retaining ring 42.

In the cage structure of FIG. 7, each of the cage segments 35 receives only a single ball 1 which is capable of moving in the circumferential direction between the ball guide surfaces 372. The segments 35 are similarly slidable upon the retaining ring 42.

Figures 8, 9:
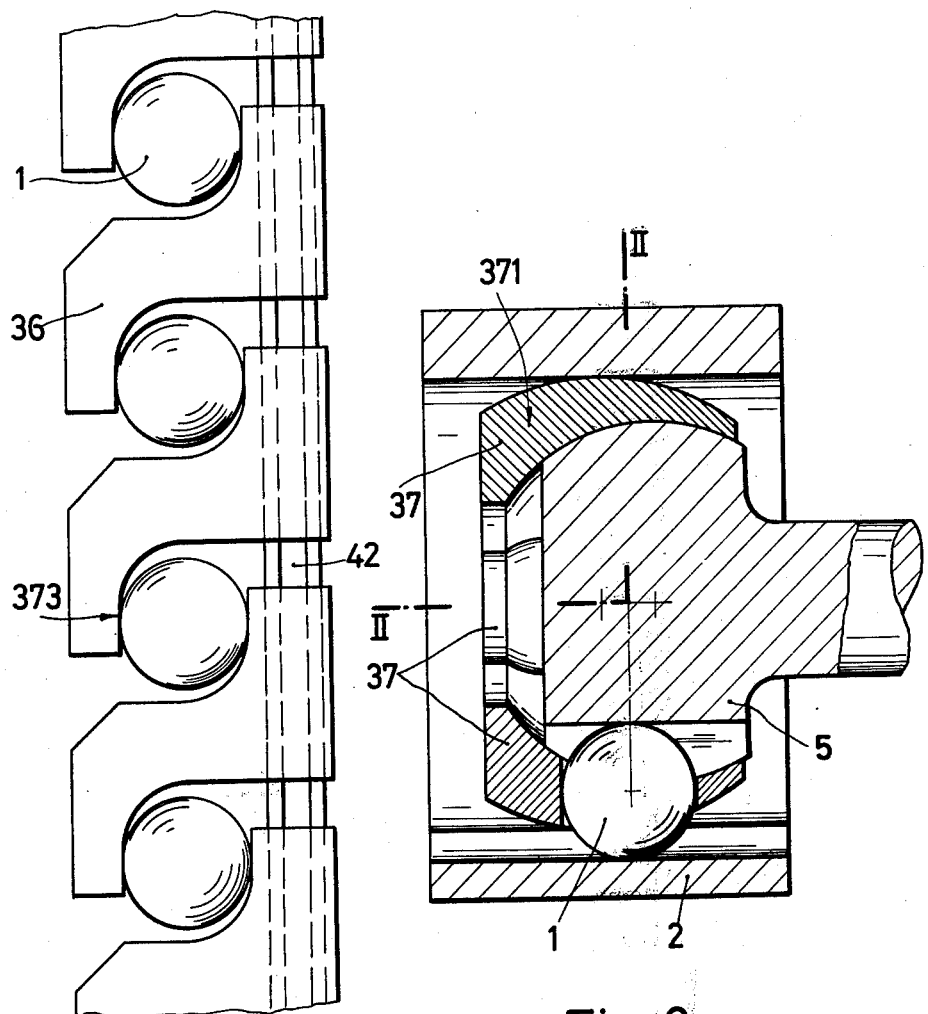
FIG. 8 is a developed view of still another form of cage segments.
FIG. 9 is a longitudinal sectional view of a constant velocity torque transmitting joint provided with the cage segments according to the present invention wherein the segments are mounted for mutual support.

In FIG. 8, the cage segments 36 are constructed so that each ball 1 is guided by the cooperation of two cage segments 36 along the guide surfaces 373. The balls 1 are capable of some circumferential movements in the segments 36.

In the constant velocity joint of FIGS. 9 and 10, cage segments 37 are positioned radially between the inner joint member 5 and the outer joint member 2 so as to guide the balls 1 in their track grooves as described above. The cage segmetns 37 support each other at their ends in the radial direction so that the segments cannot be pushed of position when assembeled in a joint. As can be seen in FIG. 10, when the cage segments 37 are assembled, they form a closed cage. The cage comprises three segments 37 with each segment accommodating two of the balls 1. The cage segments 37 thus mutually support each other in the radial direction and when asssembled form a closed cage. The balls 1 are capable of movement in the circumferential direction within the openings of the segments.

In FIG. 11, the cage comprises five cage segments 38 and each segment receives one of the balls 1. The cage segments 38 similarly define a closed cage when assembled and are mutually engagable so as to support each other in the radial direction.

Thus it can be seen that the present invention has disclosed a cage structure formed of a plurality of segments which when assembled in a joint form a cage which supports and retains the torque transmitting elements.. Further, the cage segments are capable of ready assembly and may be fabricated by forming and shaping operations which do not require the removal of material.

It will be understood that this invention is susceptible to modification in order to adapt it to different usages and conditions, and accordingly, it is desired to comprehend such modifications within this invention as may fall within the scope of appended claims.

What is claimed is:

1. A constant velocity torque transmitting joint comprising an outer joint element having a bore therethrough and a plurality of grooves in the surface of said bore, an inner joint element within said bore and having a plurality of grooves in its outer surface corresponding in number to said outer joint element grooves to define pairs of opposed grooves, a plurality of balls between said joint elements with each ball being in a pair of opposed grooves, a cage between said joint elements and having a plurality of openings therein to retain said balls in a plane which is perpendicular to the axis of the cage and which bisects the angle between the joint elements, said cage having a first spherical surface on its outer face and a second spherical surface on its inner face, means on the inner face of said outer joint element coacting with said cage first spherical surface for guiding said cage with respect to said outer joint element, said inner joint element having convex spherical outer surface means for coacting with said cage second spherical surface, the centers of said first and second cage spherical surfaces being equidistant on opposite sides of said ball plane, said cage comprising a plurality of segments each receiving at least one of said balls, and means for radially supporting said segments with respect to each other.

2. A constant velocity torque transmitting joint as claimed in claim 1 wherein said supporting means comprises mutually engaging surfaces on said segments.

3. A constant velocity torque transmitting joint as claimed in claim 1 wherein said supporting means comprises a retaining ring engaging said segments.

4. A constant velocity torque transmitting joint as claimed in claim 3 wherein said segments are slidable in the circumferential direction of said ring.

* * * * *